R. M. WEEKS.
PROCESS AND APPARATUS FOR ELECTRICAL ETCHING.
APPLICATION FILED APR. 25, 1921.

1,427,877.

Patented Sept. 5, 1922.

WITNESS:
Rob't P. Kitchel.

INVENTOR
Raymond M. Weeks
BY
Frank S. Busser
ATTORNEY.

Patented Sept. 5, 1922.

1,427,877

UNITED STATES PATENT OFFICE.

RAYMOND M. WEEKS, OF NARBERTH, PENNSYLVANIA, ASSIGNOR TO WEEKS PHOTO-ENGRAVING COMPANY, INC., OF PHILADELPHIA, PENNSYLVANIA, A CORPORATION OF PENNSYLVANIA.

PROCESS AND APPARATUS FOR ELECTRICAL ETCHING.

Application filed April 25, 1921. Serial No. 464,320.

*To all whom it may concern:*

Be it known that I, RAYMOND M. WEEKS, a citizen of the United States, residing at Narberth, county of Montgomery, and State of Pennsylvania, have invented a new and useful Improvement in Processes and Apparatus for Electrical Etching, of which the following is a full, clear, and exact description, reference being had to the accompanying drawings, which form a part of this specification.

My invention relates to the art of electrical etching and has for its object the provision of means and the carrying out of a process whereby etched plates of a quality superior to that obtained by present methods may be produced.

In the process of electrical etching, the plate to be etched is immersed in a bath of electrolyte and connected to a source of electric current to form an anode. A cathode is immersed in the electrolyte. The electric current then passes through the plate to the cathode and in its passage through the plate dissociates the material of the exposed or non-insulated portions of the plate. The dissociated material falls away from the plate into the bath and, depending on the nature of the bath, is either precipitated or goes into solution therein. The process continues until the plate has been etched to the required depth.

In the processes of electrical etching as now practiced, a certain substantial period of time is required for the dissociated material to become free and drop away from the plate. There is thus at all times a considerable quantity of dissociated material clinging to the face of the plate with the result that the etching is slowed down and it is impossible to produce a clean cut plate in which the contrast or relation between lights and darks can be maintained of a high quality.

In the present methods of electrical etching, the quality of the plate is lowered by the fact that the current dissociates material from the side walls of the etched portions, with the result that the ideal proportion between the light, middle and dark tones cannot be secured, the middle and dark tones being unduly reduced.

In accordance with my invention, I have discovered that if the plate to be etched is suspended in the electrolytic bath with its face parallel to the face of a cathode and during the period in which the current is active, oscillated in a plane parallel to the plane of the face of the cathode, the action of the current will be along straight lines without a tendency to undercutting, and the material dissociated by the action of the current will be removed as fast as dissociation takes place, while at the same time a perfect solution of electrolyte will be maintained constantly against the face of the plate.

By virtue of my invention, I am able to produce a clean cut plate, of very high quality, in which the contrasts are of a high order and at the same time effect the etching substantially more rapidly than is possible by present methods.

Having now indicated the substance and advantages of my invention in a general way, I will proceed to describe it in detail with reference to the accompanying drawings, in which—

$a$ indicates a tank, mounted on any suitable supports as $b$, $b$, adapted to contain an electrolytic bath. Extending around the outside of the tank adjacent to its upper edge is a bus bar $c$, which is suitably connected to the negative pole of a source of current. A cathode $d$, which is preferably formed from a thin sheet of silver, is immersed in the tank and connected to the bus bar $c$ by means of leads $e$.

Figure 1:
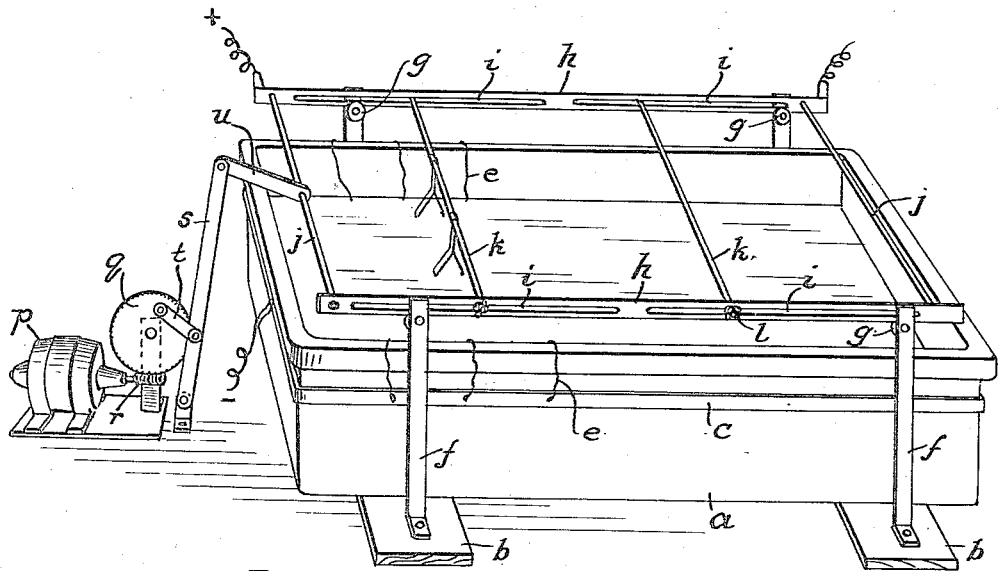
Fig. 1 is a perspective view of an apparatus for electrical etching embodying my invention.
Figure 2:
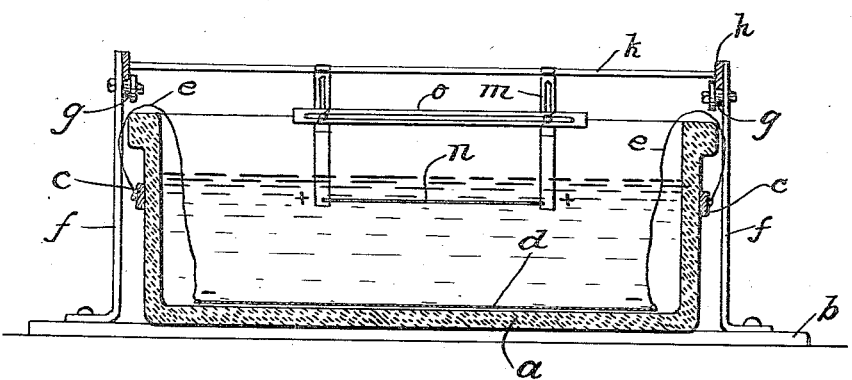
Fig 2 is a cross-sectional view.
Figure 3:
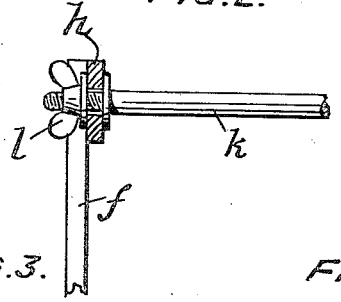
Fig. 3 is a view of a detail of the apparatus.
Figure 4:
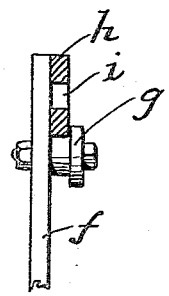
Fig. 4 is a view of a detail of the apparatus.

Supports or standards $f$ having flanged rollers $g$ journaled adjacent their upper ends are mounted at opposite sides of the tank and extend above the upper edge thereof. A frame constructed of conducting material and comprising side members $h$ provided with longitudinally extending slots $i$, one of which is suitably connected with the positive pole of a source of current, and end members $j$, is reciprocably supported on the rollers *g*. Rods *k* the ends of which extend through the slots *i* are adjustably supported by the side members *h* and secured in adjusted position by means of wing nuts *l* threaded on their ends. Supporters *m* are suspended from rod *k* and adjustably secured to each other by means of the slotted bar *o*, as shown in Figure 2.

Adjacent one end of the tank is mounted an electric motor *p* adapted to drive a worm wheel *q* through a worm *r*. The wheel *q* is connected to an oscillating lever *s* by means of a link *t*. The lever *s* is pivoted at one end to a base and at the other is connected, by means of a link *u* of fibre or other non-conducting material, to one of the end members *j* of the frame.

In practice, the plate to be etched is supported from rod *k* face downward in a plane parallel to the plane of the face of the cathode in the electrolytic bath, current passes to it from the frame and from it directly downward to the cathode, resulting in an etching of the plate. During the time in which the current is acting, the motor *p* is operated which results in oscillating lever *s* and in moving the frame back and forth on rollers *g*, which in turn causes the plate during the etching process to be moved back and forth in the electrolytic bath over the face of the electrode.

The movement of the plate in a plane parallel to the plane of the cathode results in a continuous immediate removal from the plate of the material dissociated by electrolysis as dissociation takes place and in a continuous and straight line action of the current between the plate and the cathode. At the same time, constantly changing portions of the surface of the cathode are actively related to the plate and the movement of the plate in the electrolyte insures a clean and ideal solution in contact with the face of the plate at all times.

Having now fully described my invention, what I claim and desire to protect by Letters Patent is:—

1. The method of electrical etching which comprises immersing a plate to be etched in a bath of electrolyte, passing a current of electricity from said plate to a cathode, through said bath, and imparting movement to said plate in the plane of its face, while the current is active.

2. The method of electrical etching which comprises immersing a plate to be etched in a bath of electrolyte, passing a current of electricity from the plate to a cathrode, through said bath, and imparting movement to the plate in the plane of its face, while the current is active to effect the removal of material dissociated therefrom by electrolysis.

3. The method of electrical etching which comprises immersing a plate to be etched in a bath of electrolyte, passing a current of electricity from the plate to a cathode, through said bath, imparting movement to the plate, in the place of its face, while the current is active to effect the removal of material dissociated therefrom by electroylsis, and absorbing the dissociated material in the bath.

4. The method of electrical etching which comprises immersing a plate to be etched in a bath of electrolyte in substantially parallel relation to a cathode, passing a current of electricity through said bath from said plate to said cathode, and reciprocating the plate in the plane of its face while the current is active.

5. The method of electrical etching which comprises immersing a plate to be etched horizontally face downward in a bath of electrolyte in substantially parallel relation to a cathode, passing a current of electricity from the plate to the cathode through the bath, and reciprocating the plate in the plane of its face while the current is active.

6. The method of electrical etching which comprises immersing a plate to be etched in a bath of electrolyte horizontally face downward in substantially parallel relation to a cathode the superficial surface of which exceeds in extent that of the face of the plate, passing a current of electricity from the plate to the cathode, and reciprocating the plate in the plane of its face over the surface of the cathode while the current is active.

7. The method of electrical etching which comprises immersing a plate to be etched in a bath of electrolyte horizontally face downward in substantially parallel relation to a cathode the superficial surface of which exceeds in extent to that of the face of the plate, passing a current of electricity from the plate to the cathode, and reciprocating the plate over and in parallelism to the surface of the cathode, while the current is active, thereby removing from the surface of the plate material dissociated therefrom by electrolysis, agitating the bath and presenting the face of the plate to a constantly changing cathode surface.

8. Apparatus for electrical etching comprising, in combination, an electrolytic bath, a cathrode in electrical connection with the negative pole of a source of current, a plate to be etched in electrical connection with the positive pole of a source of current, and means adapted to impart movement to said plate in the plane of its face while in the electrolytic bath.

9. Apparatus for electrical etching comprising, in combination, an electrolytic bath, a cathode in said bath, a plate to be etched, and means adapted to reciprocate said plate in the plane of its face while in said bath.

10. Apparatus for electrical etching comprising, in combination, an electrolytic bath, a cathode, in electrical connection with the negative pole of a source of current, immersed in said bath, a plate to be etched in electrical connection with the positive pole of a source of current, means for the support of said plate in said bath, and means adapted to effect reciprocation of said plate supporting means whereby said plate will be reciprocated in the plane of its face.

11. Apparatus for electrical etching comprising, in combination, an electrolytic bath, a cathode, in electrical connection with the negative pole of a source of current, immersed in said bath, a plate to be etched, means, in electrical connection with the positive pole of a source of current, adapted to support said plate in the bath, a prime mover adapted to impart movement to said plate supporting means, and a connection non-conductive of electricity affording a connection between said prime mover and said plate supporting means.

12. An apparatus for electrical etching comprising, in combination, an electrolytic bath, a cathode of relatively great superficial area horizontally disposed in said bath, a plate to be etched having a relatively small superficial area and in electrical connection with the positive pole of a source of electric current, means to suspend the plate in a horizontal position within said bath above said cathode, and means to impart to said plate, while so immersed, a movement in said bath back and forth in a substantially horizontal direction.

In testimony of which invention, I have hereunto set my hand, at Philadelphia, Pa., on this 22nd day of April, 1921.

RAYMOND M. WEEKS.